Inventor
Thomas O. Kosatka
By George H. Simmons
Att'y.

United States Patent Office 3,480,286
Patented Nov. 25, 1969

3,480,286
VALVE STEM SEAL
Thomas O. Kosatka, Chicago, Ill., assignor to Victor Manufacturing and Gasket Company, Chicago, Ill., a corporation of Illinois
Filed Aug. 9, 1967, Ser. No. 659,461
Int. Cl. F16j *15/32, 15/56*
U.S. Cl. 277—182                                    6 Claims

ABSTRACT OF THE DISCLOSURE

A plastic sealing washer fixed in a cup shaped metal shell by an elastomeric material bonded to the shell and dimensioned for press fit upon a valve stem guide to position said washer in seal forming engagement with the valve stem.

---

This invention relates to seals for the valve stems of overhead valves of internal combustion engines and has for it principal object the provision of a new and improved seal of this type.

It is a main object of the invention to provide a valve stem seal capable of being securely fixed upon the valve stem guide of an internal combustion engine and of forming a low friction fluid seal with a valve stem supported in the guide.

Another object of the invention is to provide a metal encased seal adapted for press fitting upon a valve stem guide and containing a low friction plastic sealing element secured in seal forming engagement with a valve stem that is supported in said guide.

Another object of the invention is to provide a valve stem seal having a low friction plastic sealing element that is fixed in a metal shell by a liner of elastomeric material that engages the element and is bonded to the shell.

Another object of the invention is to provide a metal encased valve stem seal having a low friction plastic sealing element that can be manufactured at low cost without sacrificing quality.

Figure 1:
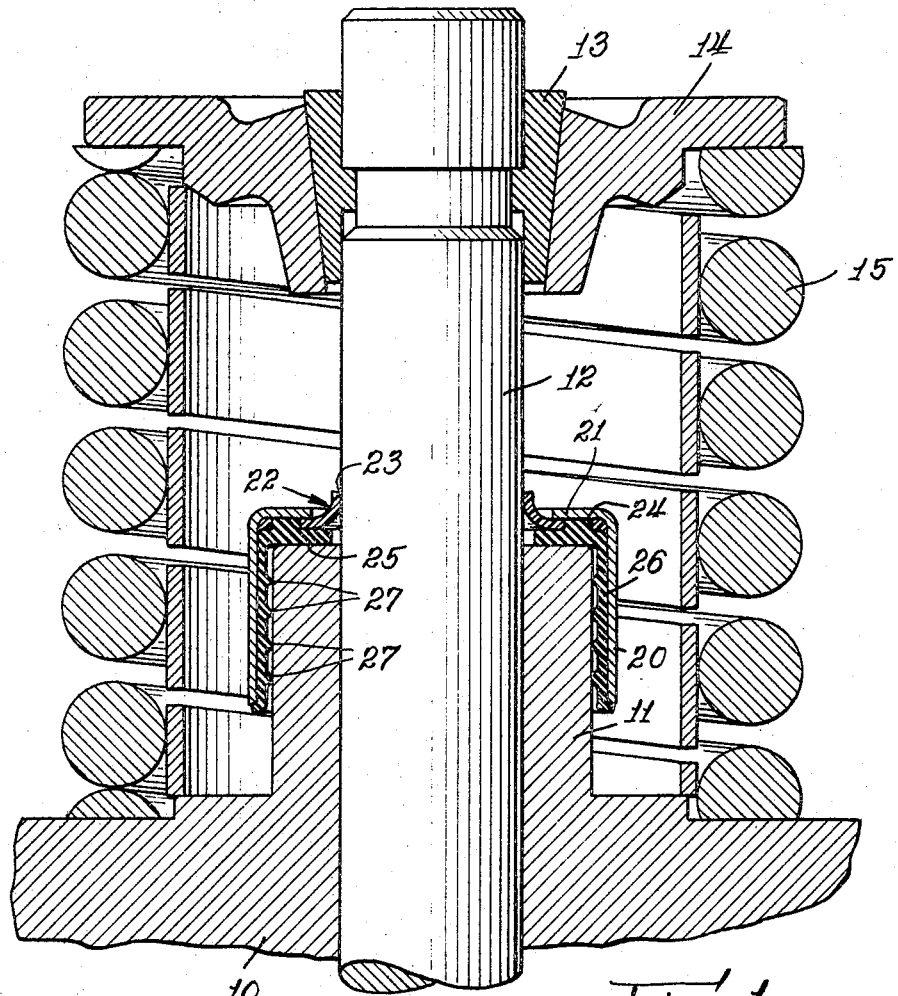
Figure 2:
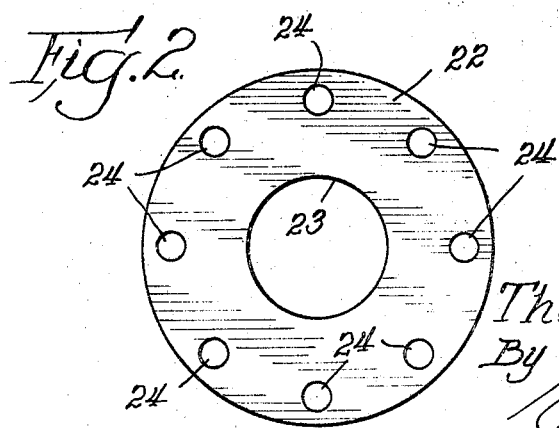

Further objects of the invention not specifically mentioned here will be apparent from the detailed description and claims which follow, reference being had to the accompanying drawings in which a preferred embodiment of the invention is shown by way of example and in which:

FIGURE 1 is an elevational view, partly in cross section, drawn to an enlarged scale, and showing the seal of the present invention installed in a typical valve stem assembly; and FIGURE 2 is a plan view of the sealing element shown in FIGURE 1.

Many intnernal combustion engines, particularly those used in automotive vehicles, are equipped with overhead valves supported in the cylinder head of the engine and operated either by rocker arms or cams located above the cylinder head. Lubricants applied to the rocker arms or cams have a tendency to travel down the valve stem into the chamber controlled by the valve. Flow of lubricant into this chamber oftentimes impairs the operation of the valve through carbonization of the lubricant and therefore it is advantageous to prevent excessive amounts of lubricant from traveling down the valve stem into the chamber.

The present invention provides a valve stem seal of simple design that can be manufactured at low cost and installed in seal forming engagement with the valve stem in a convenient manner.

In its preferred form the seal of the present invention consists of a cup shaped metal shell having a cylindrical wall dimensioned for loose fit over the cylindrical valve stem guide of the engine. A sealing element fixed in this shell against the radial end wall thereof engages the valve stem to form a fluid tight seal therewith. The metallic shell is lined with an elastomeric material bonded thereto and dimensioned for press fit over the valve stem guide to secure the seal thereupon.

Low friction plastics, such as polytetrafloroethylene, for example, can not be bonded to metal and can be cemented thereto only with difficulty and as a result sealing elements formed of such plastics have been clamped into the metallic shells in which they are housed. The seal of the present invention employs a plastic sealing washer that is secured in the metallic shell by the elastomeric liner with which the shell is lined. As a result of this construction, seals can be manufactured at lower cost then required for seals in which a plastic sealing element is fixed in a metallic shell by clamping.

Referring now to the drawing in more detail, as shown the cylinder head 10 is equipped with a cylindrical stem guide 11 in which the stem 12 of the valve has sliding fit. The valve assembly consists of the usual wedge 13 by which the valve stem is secured in the spring collar 14 through the action of the spring 15. The details of the valve assembly are not of the essence of the present invention and the arrangement shown is shown by way of example only.

The seal of the present invention consists of a metallic shell having a cylindrical portion 20 dimensioned to fit loosely over the valve stem guide 11. An annular wall 21 extends radially inwardly from one end of the cylindrical portion 20 and terminates outwardly from the stem engaging wall of the guide 11.

The sealing element 22, preferably composed of a low friction plastic such as polytetrafluoroethylene is shaped as a washer having an outside diameter approximating the inside diameter of the cylindrical wall 20 of the shell. The inner edge 23 of the sealing element is in the form of a circle whose diameter is less than the diameter of the stem 12 of the valve.

As will be seen best in FIGURE 2 the sealing element contains a plurality of holes or perforations 24 shown to be eight in number although the particular number can be varied within the teachings of the invention.

The sealing element is fitted in the shell in engagement with the annular wall 21 thereof and is secured in the shell by radial wall 25 of a liner which projects through the perforations 24 in the sealing element into engagement with the annular wall 21 to which it is bonded. It will be noted that the inner edge of the wall 25 is disposed radially inwardly from the inner edge of the annular wall 21 and radially outwardly from the inner edge of the washer 22.

Integral with the annular wall 25 is a cylindrical wall 26 which is bonded to the inside surface of the cylindrical wall 20 of the shell. It will be noted that the diameter of the inner surface of the cylindrical wall 26 is greater than the diameter of the valve stem guide 11. Wall 26 is equipped with a plurality of inwardly extending ribs 27 preferably of V-shape in cross section and terminating at their apexes on a cylinder whose diameter is less than the diameter of the outer surface of the valve stem guide 11. Preferably the liner is composed of an elastomeric material that is impervious to oils and the like and is capable of being bonded to the metallic shell in a known manner.

The seal is registered with the valve stem guide by forcing the same downwardly thereupon until the radial wall 25 of the liner engages the end wall of the valve stem guide. The ribs 27 are compressed by this action thereby securing the seal upon the valve stem guide and forming a fluid tight seal therewith.

It will be noted that the outer surfaces of the metallic shell are exposed and will be engaged by an inserting tool if such a tool is used. If necessary the tool can be struck with a hammer to force the seal upon the valve stem guide. Since the tool engages only metal, damage to the seal during installation is eliminated.

Four cycle internal combustion engines require two valves per cylinder and these valves usually must be quite close together. As a result the space between adjacent valve stem guides is quite limited. Since the outer wall of the metallic shell is cylindrical and devoid of outwardly extending flanges and the like, the seals can be installed upon adjacent closely spaced valve stem guides without difficulty.

As the valve stem 12 is pushed axially through the valve stem guide the sealing element 22 is moved out of planar shape into arcuate shape as shown in FIGURE 1. The inner edge of the element 22 is stretched over the valve stem 12, this stretching supplying tension needed to form and maintain a fluid tight seal with the stem. With the seal thus in operating position oil or other lubricant moving down the valve stem from the rocker arm or cam is wiped off of the stem and thereby prevented from entering the chamber in which the valve is located.

Throughout the foregoing, the seal of the present invention has been shown and described as a valve stem seal and while such use is one to which the teachings of the invention are applicable, other uses are contemplated. The invention may be incorporated in any seal having a plastic sealing element engaging a rotating or reciprocating shaft or rod, and supported in a metal shell by a liner of elastomeric material bonded to that shell.

From the foregoing it will be apparent that the seal of the present invention secures the advantages of a low friction plastic sealing element secured in the metallic shell of the seal in a simple and inexpensive manner and the seal as a whole is secured upon a support in a simple manner.

Having thus complied with the statutes and shown and described a preferred embodiment of my invention what I consider new and desire to have protected by Letters Patent is pointed out in the appended claims.

What is claimed is:

1. A valve stem seal adapted to be supported upon a valve stem guide and to engage a valve stem supported in said guide to form a seal therewith, said seal comprising:
   (a) a shell consisting of
      (a') a cylindrical portion dimensioned to fit loosely over said guide; and
      (a") an annular portion projecting inwardly from the upper end of said cylindrical portion and terminating radially outwardly from the valve stem engaging surface in said guide;
   (b) a low friction plastic sealing washer containing a plurality of perforations and positioned against the inner surface of said annular portion and extending radially inwardly from the inner edge of said portion;
   (c) and a liner of elastomeric material bonded to inner surfaces of said shell, engaging said washer and extending through said perforations to the shell to which it is bonded to fix the washer in the shell, and dimensioned for press fit upon said guide to support the seal thereupon.

2. A seal as specified in claim 1 in which the shell is composed of metal and the washer is composed of polytetrafluoroethylene.

3. A seal as specified in claim 1 in which the washer engaging portion of the liner terminates at its inner edge radially inwardly from the inner edge of the annular portion of the shell and radially outwardly from the inner edge of the washer.

4. A seal as specified in claim 3 in which the inner surface of the cylindrical portion of the liner has a diameter greater than the diameter of the guide and contains inwardly extending ribs each of which terminates on a circle whose diameter is less than the diameter of the guide.

5. A seal as specified in claim 4 in which the outer surfaces of the metal shell are exposed and adapted to be engaged by an inserting tool as the seal is being forced over the guide during installation thereon.

6. A seal as specified in claim 5 in which when installed upon a guide is fixed thereon by compression of the ribs and located axially thereon by engagement of the washer engaging portion of the liner with the end of the guide and the washer is bent from planar to arcuate shape and its inner edge is stretched by engagement with the valve stem supported in the guide to form a seal with the stem.

References Cited

UNITED STATES PATENTS

| 3,326,562 | 6/1967 | Deuring | 277—182 |
| 3,379,445 | 4/1968 | Fisher | 277—188 X |

FOREIGN PATENTS

| 544,881 | 4/1942 | Great Britain. |

SAMUEL ROTHBERG, Primary Examiner

U.S. Cl. X.R.

123—188; 277—208